United States Patent
Chen et al.

[11] Patent Number: 6,098,337
[45] Date of Patent: Aug. 8, 2000

[54] ORCHID CULTIVATING DEVICE

[76] Inventors: Ruey Chen; Ellen Chen, both of No. 44, Chang-Nan Rd., Sec. 2, Nantou City, Taiwan

[21] Appl. No.: 09/270,731

[22] Filed: Mar. 16, 1999

[51] Int. Cl.[7] .......................... A01G 31/00; A01G 17/06; A01G 9/02

[52] U.S. Cl. .................. 47/62 A; 47/47; 47/66.1

[58] Field of Search ..................... 47/1.01 R, 27, 47/30, 47, 48.5, 75, 62 A, 62 C, 62 R, 63, 65.5, 66.1, 66.3, 66.7, 67, 901, 904, 58.1

[56] References Cited

U.S. PATENT DOCUMENTS

| | | | |
|---|---|---|---|
| 620,150 | 2/1899 | Kitchen | 47/66.1 |
| 2,893,169 | 7/1959 | Shepherd | 47/47 |
| 3,988,858 | 11/1976 | Bomba | 47/58 |
| 4,869,019 | 9/1989 | Ehrlich | 47/62 |
| 6,021,602 | 2/2000 | Orsi | 47/62 A |

*Primary Examiner*—Peter M. Poon
*Assistant Examiner*—Francis T. Palo
*Attorney, Agent, or Firm*—Rosenberg, Klein & Lee

[57] ABSTRACT

An orchid cultivating device, which includes a flat base plate, and two guard members fastened to the flat base plate to hold sphagnum moss and orchids, wherein the base plate has a plurality of retainer rods, a plurality of clamps holding a spray tube at the top side, and a water trough for connecting excessive water; the guard members each have a plurality of arched ribs defining a plurality of open spaces for ventilation, and a plurality of peripheral mounting lugs respectively engaged with the retainer rods at the base plate. The base plate and the guard members can be injection-molded from plastics to reduce the manufacturing cost. Hanger means can be fastened to through holes at the base plate for carrying by hand, or hanging on a high place.

8 Claims, 4 Drawing Sheets

ORCHID CULTIVATING DEVICE

BACKGROUND OF THE INVENTION

The present invention relates to an orchid cultivating device for cultivating orchids, and more particularly to such an orchid cultivating device which is inexpensive to manufacture and easy to use, and has means to facilitate ventilation.

Conventional orchid cultivating plates may be made of tree fern or plastics. An orchid cultivating tree fern plate is not durable in use because it decays quickly. Because an orchid cultivating tree fern plate is obtained from natural plants, its manufacturing cost is high. Further, it is inconvenient to water an orchid cultivating tree fern plate, or to carry an orchid cultivating tree fern plate by hand. Furthermore, it is difficult to replenish an orchid cultivating tree fern plate with nourishment for cultivated orchids. Using a plastic orchid cultivating plate for cultivating orchid also has numerous drawbacks. It is inconvenient to install orchids and sphagnum moss in a plastic orchid cultivating plate. When holding orchids and sphagnum moss on a plastic orchid cultivating plate, a wrapping cloth shall be used. However, the wrapping cloth absorbs water from cultivated orchids and sphagnum moss, and interferes with water evaporating speed, causing an excessive water content in the roots of cultivated orchids. Further, using a wrapping cloth to hold cultivated orchids and sphagnum moss destroys the sense of beauty of cultivated orchids, and this method makes the replacement of sphagnum moss difficult.

SUMMARY OF THE INVENTION

The present invention has been accomplished to provide an orchid cultivating device which eliminates the aforesaid drawbacks. It is one object of the present invention to provide an orchid cultivating device, which is inexpensive to manufacture. It is another object of the present invention to provide an orchid cultivating device, which is convenient in use. It is still another object of the present invention to provide an orchid cultivating device, which provides satisfactory ventilation effect. It is still another object of the present invention to provide an orchid cultivating device, which enables cultivated sphagnum moss to be conveniently replaced. According to one aspect of the present invention, the orchid cultivating device is comprised of a flat base plate, and two guard plates detachably fastened to the base plate to hold cultivated orchid and sphagnum moss on the base plate. According to another aspect of the present invention, the guard plates each have a plurality of open spaces for ventilation. through the open spaces, sphagnum moss can easily be put into place to support cultivated orchids, or taken away for a replacement. According to still another aspect of the present invention, the guard members and the base plate are injection-molded from plastics, therefore, the manufacturing cost of the orchid cultivating device is low. According to still another aspect of the present invention, a spray tube is fastened to clamps at the base plate for spraying water or liquid fertilizer to cultivated orchids and sphagnum moss. According to still another aspect of the present invention, a water trough is provided at the bottom side of the base plate to collect excessive water. According to still another aspect of the present invention, through holes are made at the base plate for the mounting of hanger means for hanging the orchid cultivating device on a high place, or for carrying by hand.

DETAILED DESCRIPTION OF THE PREFERRED EMBODIMENT

Figure 1:
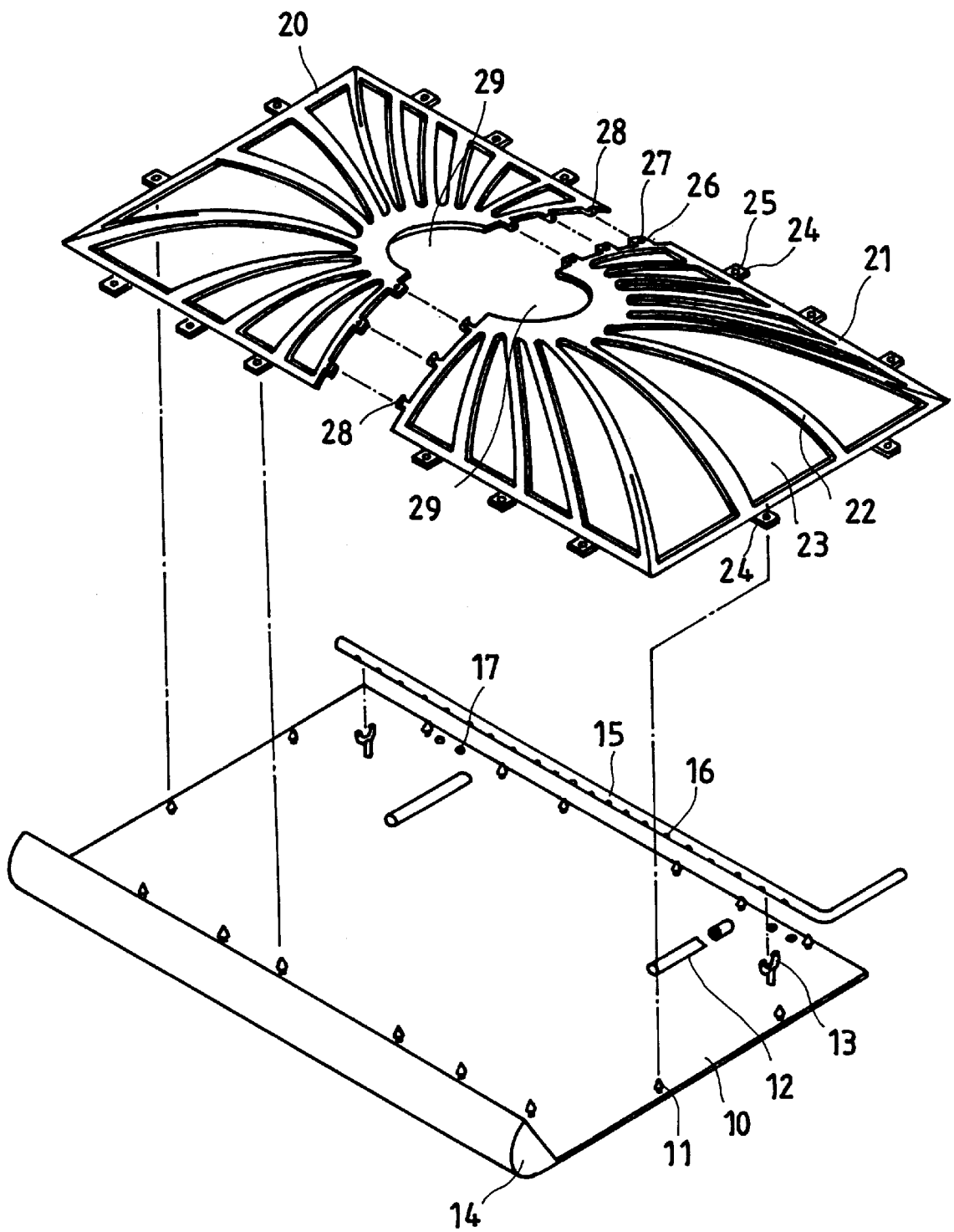
FIG. 1 is an exploded view of an orchid cultivating device according to one embodiment of the present invention.
Figure 2:
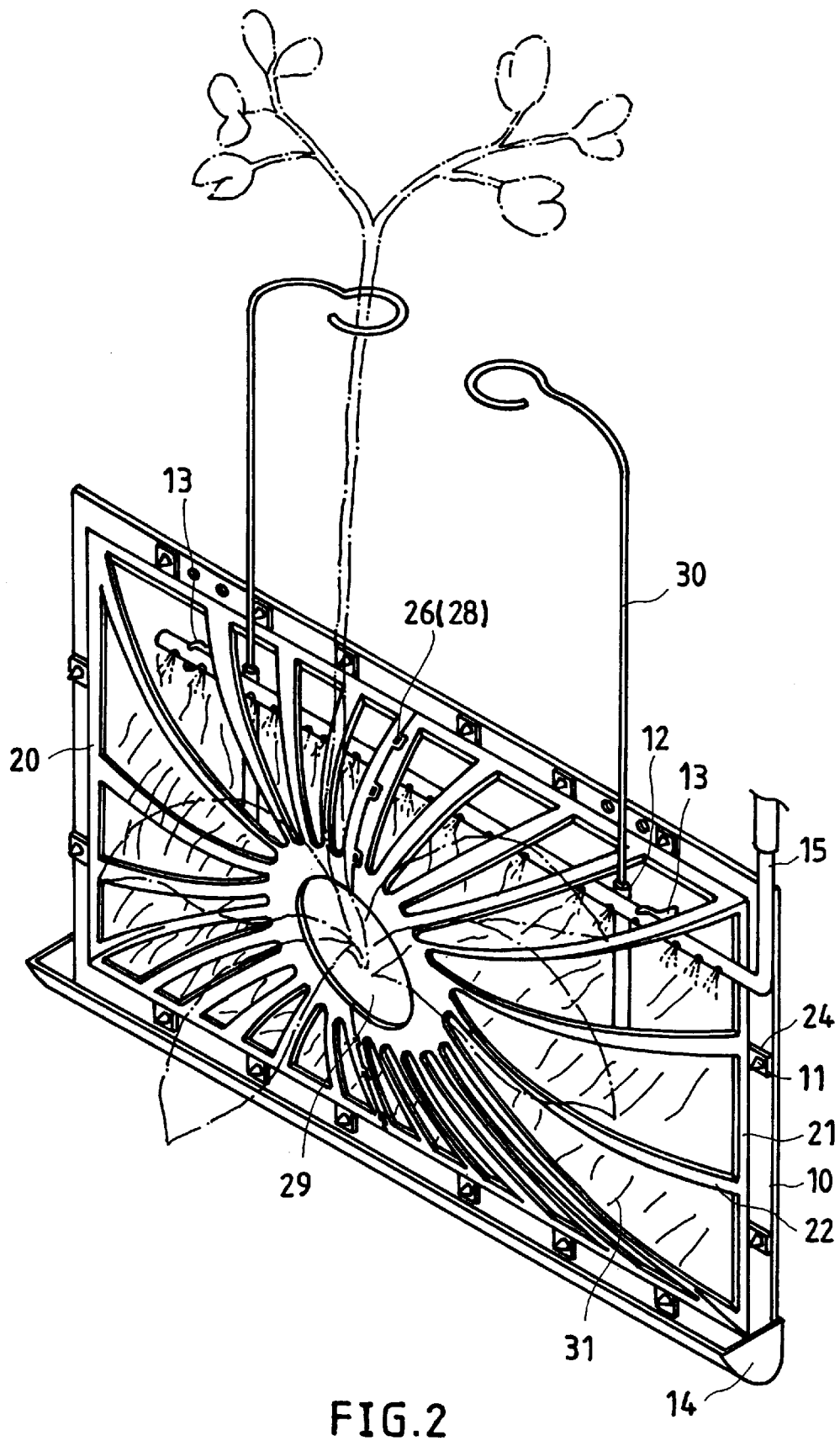
FIG. 2 is perspective assembly view of the present invention, showing orchids and sphagnum moss cultivated in the orchid cultivating device.

Referring to FIGS. 1 and 2, an orchid cultivating device is generally comprised of a base plate 10, two guard members 20.

The base plate 10 is a flat plate having a water trough 14 at its bottom side, a plurality of retainer rods 11 raised from its front side wall and spaced around its border area, a plurality of receptacles 12 formed integral with the front side wall near its top side, a row of through holes 17 arranged in a line along the top side, and a plurality of clamps 13 raised from the front side wall near the top side and holding a spray tube 15 having a plurality of water outlets 16.

The guard members 20 and 21 are symmetrical, each comprising a plurality of arched ribs 22 defining a plurality of open spaces 23, a plurality of peripheral mounting lugs 24, the lugs 24 each having a mounting hole 25 for coupling to the retainer rods 11 at the base plate 10, an opening 29 at one side, a plurality of hooks 28, and a plurality of locating plates 26, each locating plate 26 defining a hook hole 27.

The guard members 20 and 21 are connected together by hooking the hooks 28 of one guard member in the hook holes 27 at the locating plates 26 of another, and then the connected guard members 20 and 21 are fastened to the base plate 10 by forcing the retainer rods 11 into the mounting holes 25 at the mounting lugs 24. When assembled, the openings 29 at the guard members 20 and 21 are matched together, forming a center hole through which orchids are put into the inside space defined between the base plate 10 and the guard members 20 and 21. When orchids are set in position, for the passing of the stems of the cultivated orchids. Further, sphagnum moss 31 are put into the open spaces 23 to support the root of orchids. The spray tube 15 is then fastened to the clamps 13 with the water outlets 16 facing downwards toward the orchids and the sphagnum moss 31. Alternatively, sphagnum moss 31 can be arranged around the roots of the orchids and then put with the orchids on the base plate 10, and the guard members 20 are then fastened to the base plate 10 to secure the orchids and the sphagnum moss 31 in place, permitting the stems of the orchids to be extended out of the openings 29.

The aforesaid design achieves the following advantages:

1. Positive Sphagnum Moss Positioning and Good Ventilation:

When sphagnum moss are installed, they are retained in place by the arched ribs 22 of the guard members 20 and 21, and open spaces 23 are provided in the guard members 20 and 21 for ventilation.

2. Ease of Sphagnum Moss Replacement Without Causing a Damage to the Roots of the Cultivated Orchids:

When replacing rotten sphagnum moss, rotten sphagnum moss can be directly and conveniently pulled away from the open spaces 23 in the guard members 20 and 21 without damaging the cultivated orchids, and new sphagnum moss can easily be put into place through the open spaces 23. When transplanting the cultivated orchids, the guard members 20 and 21 can easily to disconnected from the base plate 10, enabling the sphagnum moss to be removed from the orchids, so that the orchids can be taken away from the base plate 10 without causing a damage.

3. Ease of Use:

As indicated above, the guard members 21 and 20 and the base plate 10 can easily be fastened together by the user to hold sphagnum moss and orchids. Therefore, it is easy to use the orchid cultivating device for cultivating orchids without any special training.

4. Low Cost and Environment Protection:

The guard members 20 and 21 and the base plate 10 can be separately injection-molded from plastics, therefore the cost of the orchid cultivating device is low. The use of plastics material instead of conventional tree fern for cultivating orchids eliminates the need to fell tress. Further, when the guard members 20 and 21 and the base plate 10 are damaged, they can be crushed for making reclaimed plastics.

5. Ease of Watering and Fertilizer Application Without Causing an Accumulation of Water:

As illustrated in FIG. 2, the spray tube 15 is provided at the top side of the base plate 10, and connected to a water source or liquid fertilizer dispenser. Water or liquid fertilizer can be delivered to the spray tube 15, and driven out of the water outlets 16 toward the cultivated orchids and sphagnum moss 31. Excessive water or liquid fertilizer automatically flows downwards to the water trough 14. Therefore, no excessive water is accumulated in the roots of the sphagnum moss 31 and the cultivated orchids.

Figure 3:
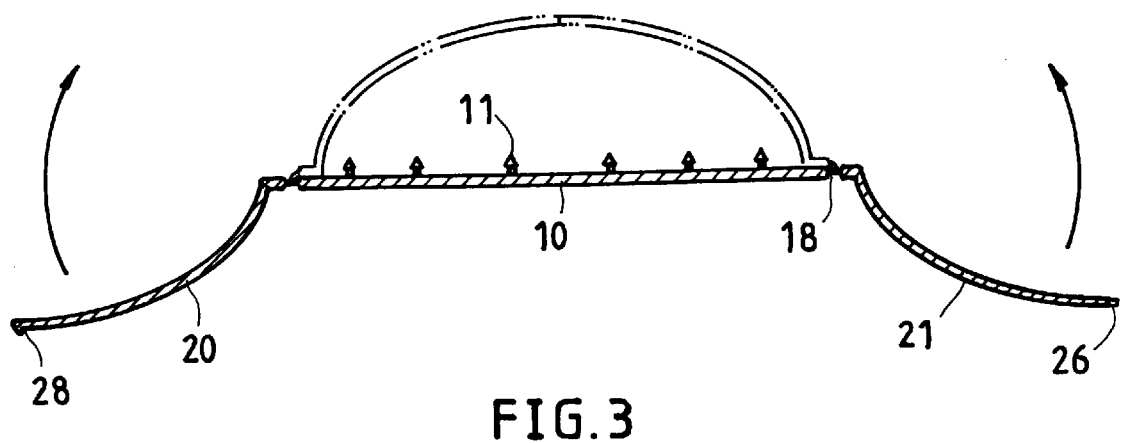
FIG. 3 is a sectional view of an alternate form of the orchid cultivating device according to the present invention.

Referring to FIG. 3, the guard members 20 and 21 can be formed integral with hinge strips 18 at two opposite lateral sides of the base plate 10 by injection molding. When in use, the guard members 20 and 21 are turned inwards toward each other, and then fastened together.

Figure 4:
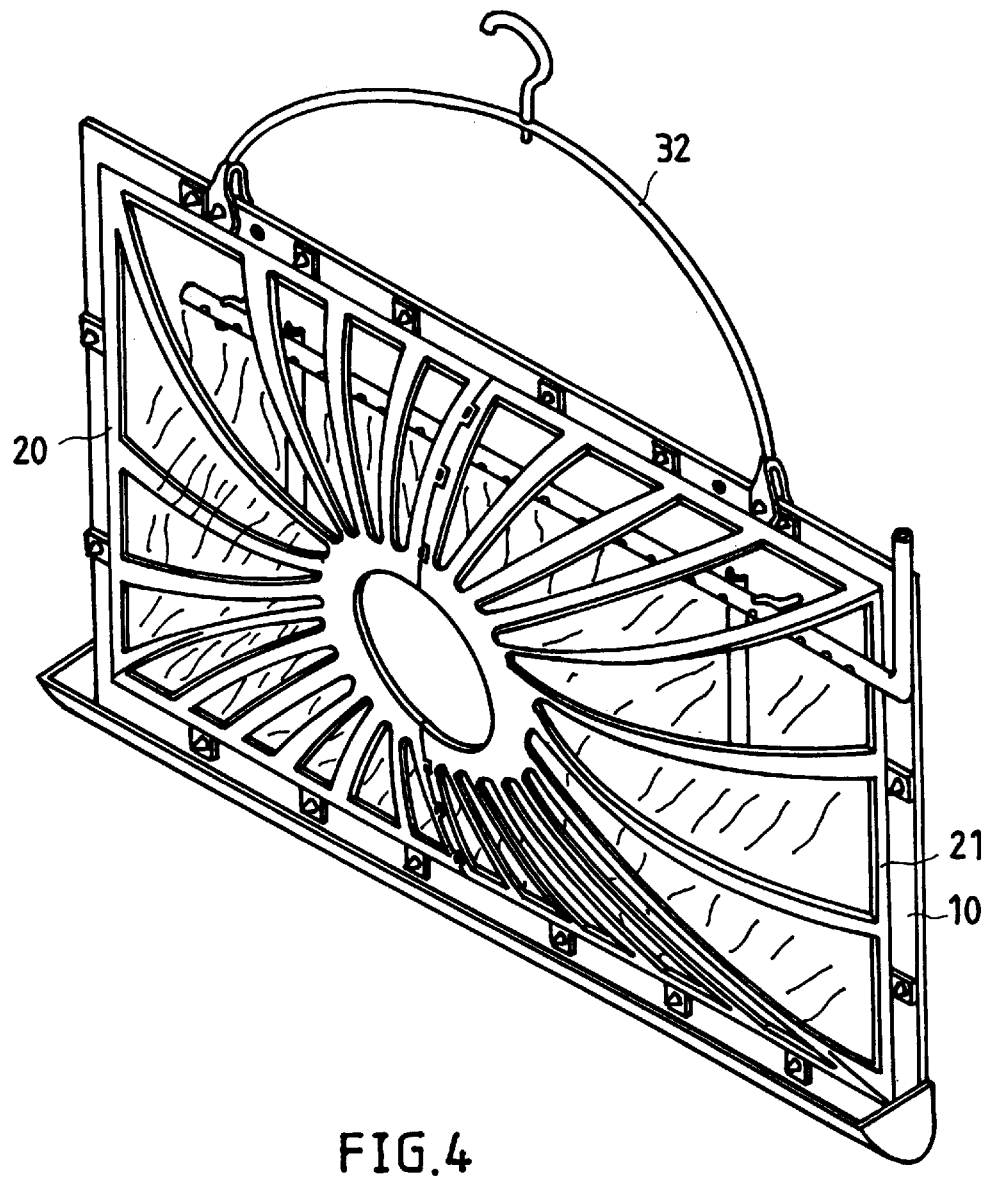
FIG. 4 shows a hanger fastened to the base plate of the orchid cultivating device according to the present invention.

Referring to FIG. 4 and FIG. 1 again, a hanger 32 may be fastened to the through holes 17 at the base plate 10. By means of the hanger 32, the orchid cultivating device can be hung on a high place, or carried by hand.

Referring to FIG. 2 again, flower stalk supporters 30 can be fastened to the receptacles 12 to support the flower stalk of orchids in the desired direction.

Figure 5:
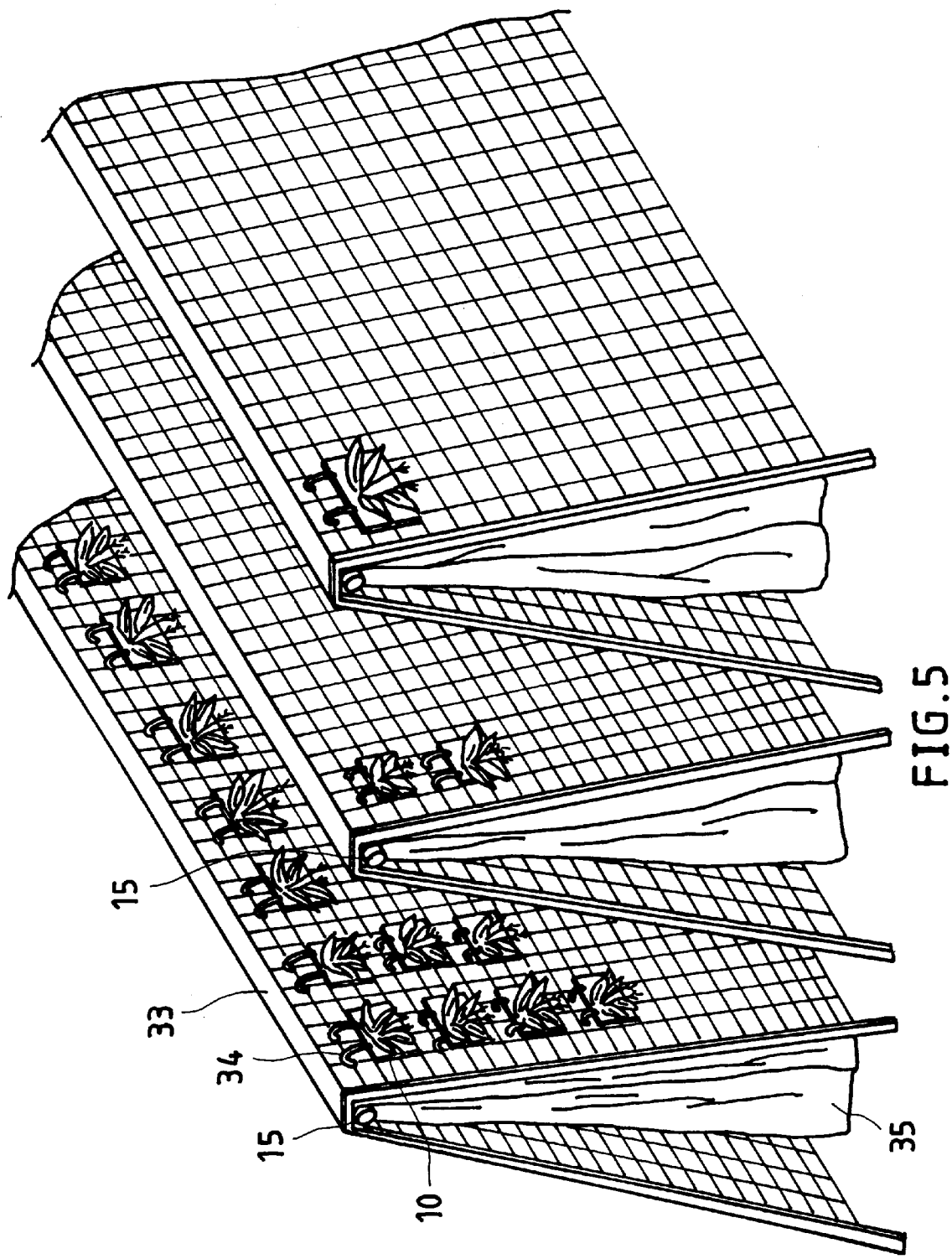
FIG. 5 shows an applied view of the present invention.

Referring to FIG. 5 and FIG. 1 again, hooks 34 can be installed in to the through holes 17 at the base plate 10 to hang the orchid cultivating device in a meshed frame 33, and curtains 35 can be suspended from the spray tube 15 to receive water from the spray tube 15, so as to increase the humidity around the meshed frame 33.

As indicated above, the guard members 20 and 21 can be separately made, and then fastened to the base plate 10. Alternatively, the guard members 20 and 21 and the base plate 10 can be made in integrity and injection-molded from plastics. The shape of the guard members 20 and 21 can be variously embodied to fit different types of plants to be cultivated.

It is to be understood that the drawings are designed for purposes of illustration only, and are not intended as a definition of the limits and scope of the invention disclosed.

What the invention claimed is:

1. An orchid cultivating device comprising a flat base plate, said flat base plate having a plurality of retainer rods spaced around the border area thereof; and two symmetrical guard members fastened to said base plate for holding orchids and sphagnum moss on said base plate, said guard members each comprising a plurality of arched ribs defining a plurality of open spaces, a plurality of peripheral mounting lugs respectively engaged with said retainer rods at said base plate, an opening at one side, a plurality of hooks, and a plurality of locating plates, said locating plates each defining a hook hole, the hooks of one of said guard members being respectively hooked in the hook holes at the locating plates at the other of said guard members.

2. The orchid cultivating device of claim 1 wherein said base plate comprises a plurality of clamps, and a spray tube fastened to said clamps, said spray tube having a plurality of water outlets for output of a liquid.

3. The orchid cultivating device of claim 1 wherein said base plate comprises a water trough securely mounted on a bottom side thereof for collecting excessive water or liquid fertilizer being applied to the orchid and sphagnum moss cultivated.

4. The orchid cultivating device of claim 1 wherein said base plate comprises a plurality of through holes for the mounting of hanger or hook means for hanging.

5. The orchid cultivating device of claim 1 wherein said base plate comprises a plurality of receptacles securely mounted on a front side wall thereof for holding flower stalk supporters for supporting the flower stalk of orchids.

6. The orchid cultivating device of claim 1 wherein said guard members are formed integral with two hinge strips at two opposite sides of said base plate.

7. The orchid cultivating device of claim 1 wherein said guard members are injection-molded from plastics.

8. The orchid cultivating device of claim 1 wherein said guard members and said base plate are injection-molded from flexible plastics, and fastened together into a curved structure.

* * * * *